DONALD O. EASTERLY
RAYMOND E. OLCOTT
INVENTORS

ATTORNEYS 3,664,608
CINEMATOGRAPHIC PROJECTOR HAVING A
FILM SUPPLY SPINDLE ASSEMBLY
Donald O. Easterly and Raymond E. Olcott, Rush, N.Y.,
assignors to Eastman Kodak Company, Rochester, N.Y.
Filed May 6, 1970, Ser. No. 34,959
Int. Cl. B65h 23/08; G03b 1/04
U.S. Cl. 242—204                                    7 Claims

ABSTRACT OF THE DISCLOSURE

A cartridge loading motion picture projector has a film supply spindle assembly that is adapted to support a film reel positioned within a cartridge on the projector or to support an unenclosed reel of film or the like. The spindle is substantially "free wheeling" when the projector is in the cartridge mode of operation to insure reliable threading of film from the cartridge to automatic threading devices of the projector. On the other hand, when the projector is adjusted to its reel mode of operation a frictional force is automatically applied to the spindle assembly to prevent such free wheeling and thereby substantially to prevent over travel of the reel when (for example), the projector is shifted from forward projection of film to projection of a simple frame of film, thereby minimizing the possibility of "spilling" film from the reel.

CROSS-REFERENCE TO RELATED APPLICATION

Reference is made to commonly assigned copending U.S. patent application Ser. No. 685,616, entitled Cinematographic Projectors or the Like and Cartridges for Use Therewith, filed in the name of John J. Bundschuh et al. on Nov. 24, 1967, now U.S. Pat. No. 3,552,683.

BACKGROUND OF THE INVENTION

Field of the invention

This invention relates to cartridge loading motion picture projectors and, more specifically, to a film supply spindle assembly for such projectors that are adapted to handle film wound on either film reels within cartridges or unenclosed film reels.

Description of the prior art

The commonly assigned U.S. Pat. No. 3,468,498 issued to L. J. Bunting on Sept. 23, 1969 and the beforementioned copending patent application Ser. No. 685,616 disclose a film supply spindle assembly for cartridge loading motion picture projectors that is adapted to support a film supply reel in a cartridge and provide for (1) free wheeling type of operation during withdrawal of film from a cartridge or (2) a friction or tendency drive type of operation when the supply reel is driven in a take-up direction during reverse projection of the film, or (3) positively driving the film reel in take-up direction during rewinding of film into the cartridge. However, the spindle assembly disclosed in such patent application and patent do not provide means for automatically converting the spindle assembly from free wheeling operation during cartridge mode of operation of the projector to a spindle assembly with a friction force or drag that prevents free wheeling type of operation when the projector is adjusted for projecting film from unenclosed film reels.

SUMMARY OF THE INVENTION

Accordingly, it is an object of this invention to provide an improved film supply spindle assembly for a cartridge loading motion picture projector or the like that is adjustable for projecting film from cartridges or from unenclosed film reels wherein the spindle assembly is capable of at least two different modes of operation, and wherein means are provided for automatically converting the spindle assembly from one mode of operation to another mode of operation as the projector is adjusted for projecting film from cartridges or reels, or vice versa. Another object of the invention is to provide a modification of an existing spindle of the type disclosed in the beforementioned patent to provide for automatic shifting of the spindle assembly from one mode of operation to another mode of operation, and to eliminate a mode selector lever used with the prior spindle.

In accordance with the present invention a spindle generally of the type disclosed in the beforementioned Bunting patent comprises a rotatable spindle member, and means coupled to the member for supporting either an unenclosed film reel or a film reel within a cartridge. Clutch means are provided for selectively applying a frictional force to the rotatable member for opposing free rotation of the reel support means when the projector is in its reel mode of operation. The clutch means comprising a clutch member frictionally coupled to the rotatable member and clutch operator means supported by the projector and movable between a first position wherein the operator means is out of engagement with the clutch member to permit free rotation of the clutch member with the rotatable member, and a second position wherein the operator means is engageable with the clutch member during rotation of the rotatable member for preventing rotation of the clutch member. In this manner a frictional force is applied to the rotatable member from the clutch member during rotation of the rotatable member. Means are provided for moving the clutch operator between its first and second positions.

The invention and its objects and advantages will become more apparent in the detailed description of the preferred embodiment presented below.

BRIEF DESCRIPTION OF THE DRAWING

In the detailed description of the preferred embodiment of the invention presented below, reference is made to the accompanying drawings, in which.

DESCRIPTION OF THE PREFERRED EMBODIMENT

Because photographic apparatus are well known, the present description will be directed in particular to elements forming part of, or cooperating more directly with, the present invention, apparatus not specifically shown or described herein being understood to be selectable from those known in the art.

Figure 2:
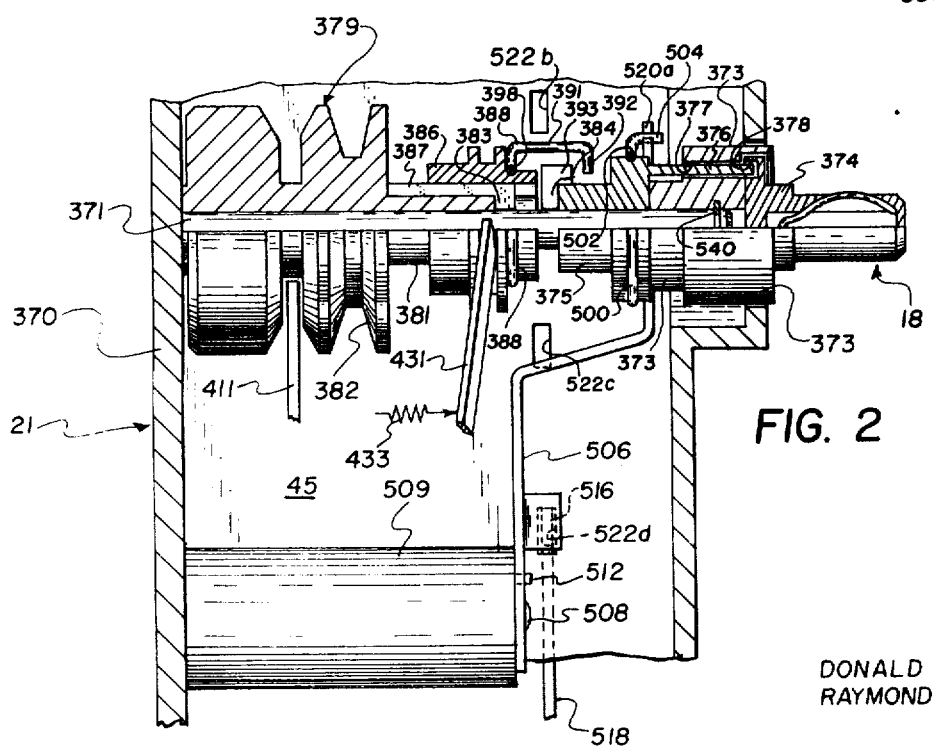
FIG. 2 is an enlarged cross section view through the FIG. 1 apparatus showing one spindle clutch member engaged for applying a frictional force to the spindle.

As previously indicated, the present invention relates to certain modifications and improvements to projector mechanisms of the type disclosed in the beforementioned copending patent application and patent. Accordingly, in order to avoid repetition here, the complete disclosure in such application and patent are incorporated herein by this reference. FIG. 2 of the drawing of this disclosure corresponds generally to FIG. 23 of such patent and application. Before proceeding with the detailed description of the modifications and improvements comprising the present invention, a brief description will be made of certain related portions of the projector and spindle assembly disclosed in such patent and patent application with reference being made to such patent and application for a more complete description of the prior mechanisms. To the extent practical, the reference numerals used in the description immediately following (and particularly those numerals that are less than the number 500) are the same as those used in said application and patent for describing the same or similar parts.

Figure 1:
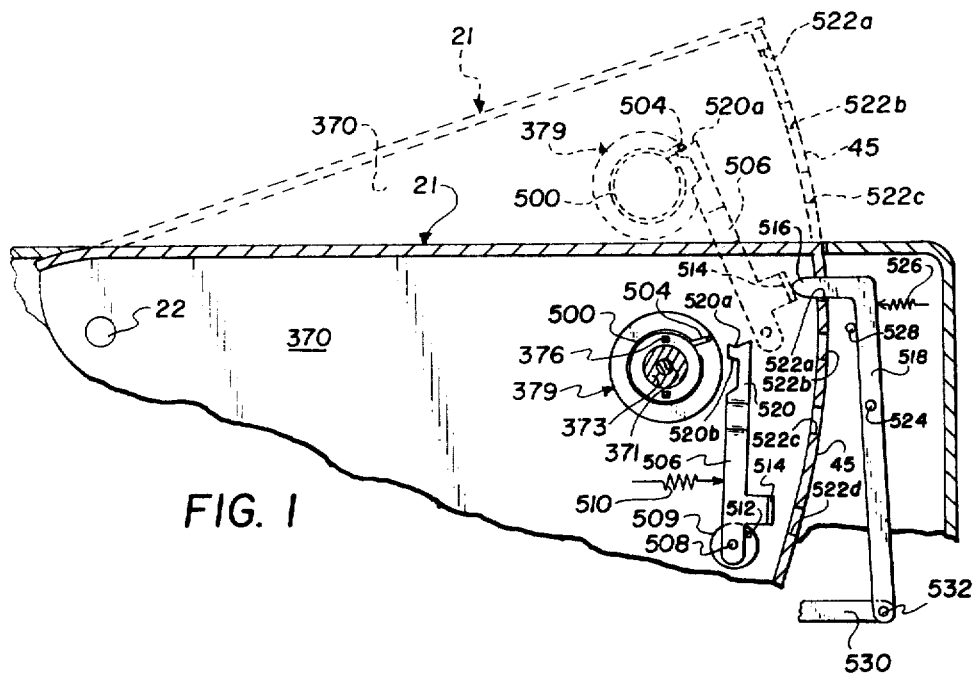
FIG. 1 is a fragmentary cross section view of a portion of a cartridge loading motion picture projector of the invention showing a portion of a spindle assembly of this invention, and showing in dotted lines a second position for various parts.

A supply spindle assembly of the invention is mounted on a back wall 370 of an arm generally designated 21, and the arm and spindle are swung about a pivot 22 between a lowered positioned shown in solid lines in FIG. 1 and each of a plurality of raised or elevated positions, one of which is shown in FIG. 2 and in dashed lines in FIG. 1. The supply spindle assembly of this invention is supported on the wall member 370 by a non-rotatable shaft 371 that is secured at one end to the wall. The unsupported or free end of shaft 371 is provided with a rotatable drum member 373 that supports a flange portion 374 of a reel drive member 18. Drum 373 is secured to shaft 371 by a snap ring 540. The reel drive member 18 is adapted to accommodate a film supply reel (not shown) that may be either inside a film cartridge or may be an unenclosed film reel or spool. Drum member 373 and flange 374 of drive member 18 form part of a weight sensitive drive unit in the prior spindle assembly discussed hereinbefore; however, that function performed by those parts is eliminated in the spindle assembly of this invention by securing member 373 and flange 374 together by cement, by an ultrasonic bonding operation, or by other suitable methods so that these two parts are functionally integral.

A finger member 375 is rotatably mounted on shaft 371 to the left of the drum member 373. The finger member has a plurality of radially spaced fingers 376 that extend through corresponding holes 377 in drum member 373 and project into similarly disposed holes 378 in the flange portion 374 of reel drive member 18, thereby coupling the drive reel rember and the drum member directly to the finger member. The corresponding finger member disclosed in the beforementtioned application and patent is movable to a retracted position (to the left of the illustrated position) wherein fingers 376 are withdrawn from the drive member flange 374 but still project into holes 377 in the drum member, thus establishing a driving connection between the drive member 18 and the finger member through a torque limiting weight sensitive drive unit. However, as noted earlier, the spindle assembly of the present invention eliminates the need for the weight sensitive drive unit and thus eliminates the need for moving the finger member to a retracted position and eliminate the related mechanism for shifting the finger member between its two positions.

A supply spindle pulley member 379 is rotatably and slidably supported on shaft 371 and includes an integral sleeve 381 that extends to the right of a pulley sheave 382. Pulley sheave 382 may be driven by a belt (not shown) from a drive system such as described in the beforementioned application and patent, and it is rotated in a direction for taking up film on reel drive member 18. The pulley member is movable axially on shaft 371 by a rewind shifter bar 411 between its illustrated position and a position to the right of the illustrated position wherein an integral axial lug 383 on sleeve 381 is engaged with a cooperating axial lug 384 on finger member 375 for coupling the finger member (and thus drive member 18) and the pulley in positive driving engagement with each other. The operation of bar 411 is described in the Bunting patent and the application mentioned before.

A friction clutch collar 386 is slidably mounted on sleeve 381 and is keyed thereto by an integral part of sleeve 381 designated 387 to prevent relative rotation between the collar and the pulley. As depicted at 388, a resilient wire member partially encircles the end of the collar member adjacent the finger member and lies partially within a peripheral groove 398 in the collar member. One end of the wire defines a clutch finger 391 having an inwardly projecting tip 392. As long as the various spindle components are positioned as illustrated, the tip 392 of this finger is spaced beyond the right edge of radial extension 393 of lug 384 so that the finger member 375 and the reel drive member 118 is coupled thereto can rotate freely on shaft 371 independently of the rotation of the pulley member 379. However, sliding axial movement of the collar 386 to the left toward the pulley member can be effected by a reverse lever 431 to move tip 392 of the clutch finger 391 into alignment with lug extension 393. The finger member 375 is then coupled to the pulley member 379 through the frictional engagement of wire clip member 388 with the surface of groove 389 so that only a predetermined amount of torque can be transmitted from the pulley member to the finger member or vice versa. This friction or tendency drive is applied to reel drive member 18 during reverse projection of film. The collar normally is held in the position illustrated by a spring 433 coupled to lever 431.

As mentioned earlier in this description and in the Bunting patent, it is desirable for the drive member 18 to be substantially free wheeling during the cartridge mode of operation of the projector and for such drive member to have a friction force opposing its rotation during the reel mode of operation of the projector. In order to apply such friction force to member 18, a clutch member in the form of a resilient wire member 500 is provided and it lies partially within a peripheral groove 502 in the finger member 375. The wire member has a projecting end portion 504 that defines a clutch finger so that such finger can be held to prevent rotation of the wire member with the finger member 375 and thereby apply a frictional or drag force to the finger member that ends to retard rotation of the drive member 18.

The clutch finger 504 can be held against rotation by means of a clutch operator or drag lever 506 that is pivoted at 508 to a post 509 supported by arm 21. The lever is biased by a spring 510 to the position shown in FIG. 1 wherein it rests against a stop 512 on post 509 and wherein the lever is positioned so that it is not engaged by the wire member 500 during rotation of the finger member 375. The lever has a flange 514 that is engageable by an end portion 516 of a latch member 518 for moving the lever arcuately about pivot 508 from its normal position (shown in solid lines to FIG. 1) to a second position (shown in FIG. 2 and in dashed lines in FIG. 1) wherein a notched end portion 520 of the lever is adjacent to finger member 375 and wherein the clutch finger 504 of the wire member is engageable with notches 520a or 520b of the notched end of the lever so that the wire member is held stationary during rotation of the finger member 375 in either direction, thereby imparting a frictional force to the finger member that tends to oppose rotation of such finger member and the reel drive member 18.

The flange 514 and the latch member 518 are located with respect to each other so that lever 506 moves to the position for engagement by the clutch finger only when arm 21 and the spindle assembly are raised to a position wherein the reel mode of operation is desired. As illustrated in the drawings, the end 516 of the latch member 518, is adapted to enter each of the four openings designated 522a–d in wall 45 of arm 21 to latch the arm in each of four position, and the lever is moved to its second position for engagement by the clutch finger 504 only when the latch member is in opening 522d. Thus the spindle drive member 18 may be free wheeling for normal cartridge type of operation when the arm is raised and the latch member is in any one of the openings 522a–c and the spindle assembly is converted automatically for reel type operation wherein a friction force or drag preferably is applied to the member 18 only when the latch member enters opening 522d.

The latch member 518 is mounted for pivotal movement about a pin 524, and it is urged by a spring 526 into its illustrated latching position wherein it is in engagement with a stop 528 and wherein the end portion 516 projects through one of the openings 522. The lever is moved away from its latching position against the biasing force of spring 526 by moving an arm 530 that is connected at 532 to the end portion of the latch member opposite from end 516.

During the cartridge mode of operation when the latch member end portion 516 is positioned in any one of the openings 522a–c and when the rewind shifter bad 411 and the reverse lever 431 are in the positions illustrated in FIG. 2, then the various parts of the spindle assembly are positioned with respect to each other so that the reel drive member 18 is substantially free wheeling and film can be unwound easily from a film reel supported on member 18. If the projector operator moves the reverse lever to the left against the bias of spring 433, then the drive from supply spindle pulley member 379 is applied through wire 388 to the lug 384, thereby to provide a slip type drive to the reel drive member 18 for driving such member in a direction for winding film onto a reel within a cartridge. This type drive is sometimes referred to as a tendency drive, and it permits film to be wound into a tight roll on the reel.

When the operator shifts the projector into the rewind mode of operation, or when the projector automatically enters the rewind more of operation in the manner described in the beforementioned application and patent, then shifter bar 411 moves the supply spindle pulley member 379 to the right to engage lug 383 with lug 384, thereby to provide a positive or direct drive to the reel drive member 18 in a direction for taking up film onto a reel supported by member 18.

When arm 21 is raised to provide for projection of film from an unenclosed film reel, the latch member end portion 516 enters opening 522d, engages flange 514 on lever 506, and swings such lever to the left against the bias of spring 510 to the position shown in phantom in FIG. 1 wherein the end 520 of the lever blocks rotation of clutch finger 504 in either direction, thereby to provide a friction force that opposes free rotation of the finger member 375 during rotation of such member in either an unwinding or a take-up direction. Thus when unwinding of film from an unenclosed film reel the friction force applied by the wire 500 prevents free wheeling of the supply reel and thereby avoids "spilling" of film from the reel. The reverse and rewind modes of operation for unenclosed film reels is the same as described hereinbefore in connection with cartridge type operation except that the spring 500 continues to exert a friction force that tends to oppose both reverse rotation of the spindle assembly and rewinding rotation of such assembly. However, the magnitude of the friction force produced by the wire 500 is relatively small in comparison with the driving forces applied to the spindle assembly through pulley member 379 during reverse and rewind modes of operation so that the wire 500 does not significantly impede the taking up of film onto the supply reel.

During operation with either a reel in a cartridge or an unenclosed film reel, the fingers 376 remain engaged with flange portion 374 of drum member 373 rather than being withdrawn from engagement with such flange as described in the beforementioned application and patent. Thus the drum member and the finger member function as a single unit and could be formed integrally, if desired.

The invention has been described in detail with particular reference to a preferred embodiment thereof, but it will be understood that variations and modifications can be effected within the spirit and scope of the invention.

We claim:

1. In a motion picture projector adapted to operate in either (1) a cartridge mode of operation wherein film is projected from a film supply reel within a cartridge supported by the projector or (2) a reel mode of operation wherein film is projected from an unenclosed film reel, the projector having means for adjusting the projector between the cartridge mode of operation and the reel mode of operation, the improvement comprising:

a spindle member rotatably supported on the projector;
means coupled to said spindle member for supporting either an unenclosed film reel or a film reel within a cartridge;
clutch means for selectively applying a frictional force to said spindle member for opposing free rotation of said reel support means when said projector is in its reel mode of operation, said clutch means comprising (a) a clutch member frictionally coupled to said spindle member and (b) clutch operator means supported by the projector and movable between (1) a first position wherein the operator means is out of engagement with the clutch member to permit free rotation of the clutch member with said spindle member and (2) a second position wherein the operator means is engageable with the clutch member during rotation of said spindle member for preventing rotation of said clutch member, thereby to apply a frictional force to said spindle member from said clutch member during rotation of said spindle member; and
means supported by the projector for moving said clutch operator between its first and second positions.

2. In a motion picture projector as set forth in claim 1 further comprising friction drive means supported by the projector and engageable with said spindle member for applying a friction force to said spindle member tending to rotate such spindle member, thereby to apply such force to said reel support means.

3. In a motion picture projector as set forth in claim 1 further comprising means engageable with said spindle member for positively driving said spindle member, and control means coupled to said driving means for moving said driving means into and out of engagement with said spindle member.

4. In a motion picture projector as set forth in claim 1 wherein said means for adjusting the projector between the cartridge mode of operation and the reel mode of operation comprises an arm movable between a first position wherein the projector is in a cartridge mode of operation and a second position wherein the projector is in a reel mode of operation, said spindle member and said clutch operator being supported by said arm for movement therewith, and said means for moving said clutch operator between its first and second positions comprises a latch member supported by a portion of the projector other than the arm and engageable with the arm for securing the arm in each of its first and second positions, said latch member having a portion engageable with the clutch operator for moving the clutch operator from its first position to its second position only when the arm is in its second position.

5. In a motion picture projector adapted to operate in either (1) a cartridge mode of operation wherein film is projected from a film supply reel within a cartridge supported by the projector or (2) a reel mode of operation wherein film is projected from an unenclosed film reel, the projector having means for adjusting the projector between the cartridge mode of operation and the reel mode of operation, the improvement comprising:

a rotatable spindle member;
means coupled to said member for supporting either an unenclosed film reel or a film reel within a cartridge;
first drive means for frictionally driving said rotatable member;
second drive means for positively driving said rotable member;
control means for selectively engaging and disengaging said first and second drive means with said rotatable member so that said rotatable member can be positively driven, frictionally driven or disengaged from both drive means so that it is freely rotatable with respect to both of said drive means;

a wire member frictionally coupled to said rotatable member and having a projecting clutch finger;

a lever movable between (1) a first position wherein the lever is spaced from said finger to permit a free rotation of the wire member with the rotatable member and (2) a second position wherein a portion of the lever is positioned to be engageable by the clutch finger during rotation of the rotatable member so that the lever prevents rotation of the wire member, thereby to apply a frictional force to said rotatable member through the wire member during rotation of the rotatable member; and means supported by the projector for moving the lever between its first and second positions.

6. In a projector as set forth in claim 5 wherein said means for moving said lever comprises a spring biasing said lever toward its first position, and means engageable with the lever for moving the lever against the biasing force of said spring into the second position of the lever.

7. In a motion picture projector as set forth in claim 5 wherein said means for adjusting the projector between the cartridge mode of operation and the reel mode of operation comprises an arm movable between a first position wherein the projector is in a cartridge mode of operation and a second position wherein the projector is in a reel mode of operation, the arm having at least two spaced openings therein for receiving a latch member, said rotatable member and said clutch operator being supported by said arm for movement therewith, and said means for moving said lever between its first and second positions comprises a latch member supported by a portion of the projector other than the arm and engageable with the openings in the arm for securing the arm in each of its first and second positions, said latch member having a portion engageable with the lever through one of the latch openings for moving the clutch operator from its first position to its second position only when the arm is in its second position and the latch member is engaged with the arm.

References Cited

UNITED STATES PATENTS 3,468,498   9/1969   Bunting _____ 242—207

LOUIS R. PRINCE, Primary Examiner

J. W. ROSKOS, Assistant Examiner

U.S. Cl. X.R.

242—205, 207; 352—73